Figure 1:
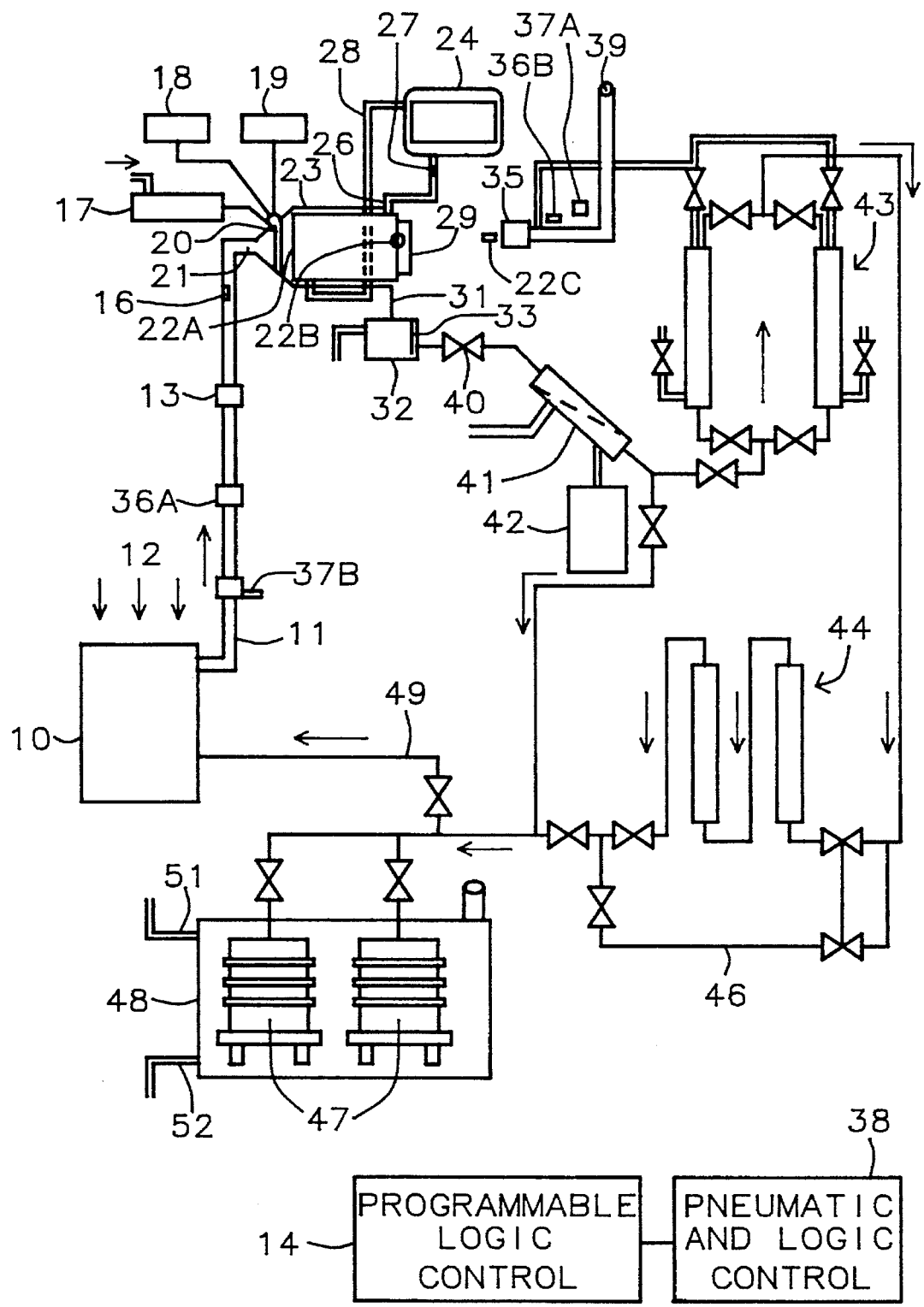

United States Patent [19]
Buet et al.

[11] Patent Number: 5,481,881
[45] Date of Patent: Jan. 9, 1996

[54] SYSTEM AND PROCESS FOR REMOVING POTENTIAL POLLUTANTS FROM A VAPOR STREAM

[76] Inventors: Michael P. Buet, 2 Mountain View Rd., New Fairfield, Conn. 06812; Steve I. Petvai, 2 Bell Air La., Wappinger Falls, N.Y. 12590

[21] Appl. No.: 364,544

[22] Filed: Dec. 27, 1994

[51] Int. Cl.⁶ .................................................. B01D 47/00
[52] U.S. Cl. ................................. 62/20; 62/37; 55/222; 55/257.7; 95/16; 95/237
[58] Field of Search ................................. 62/11, 20, 92, 62/94; 34/73, 79, 468; 55/222, 257.7; 95/16, 23, 229, 237

[56] References Cited

U.S. PATENT DOCUMENTS

| | | | |
|---|---|---|---|
| 3,593,496 | 7/1971 | Merrill | 55/257.7 X |
| 4,376,109 | 3/1983 | Wolter et al. | 55/222 X |
| 4,574,062 | 3/1986 | Weitman | 55/222 X |
| 4,620,858 | 11/1986 | Bradshaw et al. | 55/222 |
| 4,878,931 | 11/1989 | Grant | 62/11 X |
| 4,936,880 | 6/1990 | Sundberg | 55/222 |
| 5,017,351 | 5/1991 | Rafson | 95/237 X |
| 5,209,762 | 5/1993 | Lowell | 95/237 X |
| 5,261,936 | 11/1993 | Somens | 55/222 |
| 5,277,707 | 1/1994 | Munk | 55/222 X |
| 5,378,264 | 1/1995 | Wei et al. | 95/237 X |

*Primary Examiner*—Christopher Kilner
*Attorney, Agent, or Firm*—David Fink

[57] ABSTRACT

The invention relates to a system for removing an organic compound capable of forming a negative azeotrope mixture with water from a vapor stream using condensation, comprising a conducting system for providing a path for communicating the vapor stream into a condensation region; first sensing apparatus positioned in the path and operable for detecting and for evaluating the mass rate flow of the organic compound in the vapor stream flowing towards the condensation region; a second sensing apparatus positioned in the path operable for sensing the temperature in the condensation region; first supplying apparatus operable for supplying water in the form of a mist or vapor into the vapor stream; second supplying apparatus operable for supplying a hydrophobic agent into the vapor stream; third supplying apparatus operable for supplying air at a predetermined temperature into the vapor stream so that the temperature of the vapor stream is at a temperature at least above the lowest boiling point of the mixture of the organic compound and water; condensing apparatus positioned to contact the vapor stream in the condensation region with the added water and hydrophobic agent for condensing the vapor stream; and cooling apparatus coupled to the condensing apparatus and operable for maintaining the temperature difference between the condensing apparatus and the local vapor stream sufficient to induce substantial condensation of the vapor stream.

7 Claims, 4 Drawing Sheets

SYSTEM AND PROCESS FOR REMOVING POTENTIAL POLLUTANTS FROM A VAPOR STREAM

FIELD OF THE INVENTION

The present invention relates to a system and process for removing pollutants from a vapor stream, and more particularly to a system and process for removing solid particles and volatile organic chemical compounds from a rapidly moving vapor stream.

BACKGROUND OF THE INVENTION

The national concern for preventing pollution has resulted in both federal and state laws imposing serious penalties for companies causing pollution. Much of the concern is directed to organic chemical compounds because many of the compounds used in manufacturing have been found to be poisonous and/or carcinogenic.

Many industrial processes require the use of organic chemical compounds which are either classified as pollutants or produce products which would be pollutants if allowed into the environment. Thus, industry has been compelled to prevent potential pollutants from entering the environment through the use of costly operations including transforming pollutants into safe compounds, isolating pollutants and having them buried safely, and recycling pollutants to prevent pollution and to obtain further benefits from the compounds.

In general, removing potential pollutants adds to the manufacturing costs so that there has been considerable impetus for the development of effective steps for achieving this goal. Nevertheless, certain manufacturing processes present a challenging problem for the relatively low cost removal of potential pollutants such as the removal of organic solvents. This problem is much greater if the potential pollutant is to be removed from a rapidly moving vapor stream. For many manufacturing processes, it is necessary to have the vapor stream moving rapidly, sometimes in the order of 600 cubic feet per minute (cfm) or higher.

As used herein, the term "vapor stream" is intended to cover a moving stream containing vapor, or gas, or combinations thereof.

One prior art method of removing an organic solvent from a moving gas stream is to induce the organic solvent in the moving gas stream to condense and the condensed organic solvent is then removed for disposal by burying containers of the solvent. This process has several significant drawbacks. The condensation step as practiced in the prior art is not effective in removing substantially all of the potential pollutants to an acceptable level so that additional steps were required, thereby substantially increasing the costs of removing the pollutants.

SUMMARY OF THE INVENTION

The present invention overcomes the disadvantages of the prior art systems and processes by providing an efficient and substantially complete removal of volatile organic compounds and solid particles from a relatively fast moving vapor stream.

In one embodiment, the invention relates to a system for removing a volatile organic compound from a vapor stream. The organic compound is preferably miscible with water and forms a negative azeotrope. That is, a mixture having a minimum boiling point, thereby facilitating the transition from the gaseous state to the liquid state.

The invention relates to a system for removing an organic compound capable of forming a negative azeotrope mixture with water from a vapor stream using condensation, comprising a conducting system for providing a path for communicating said vapor stream into a condensation region; first sensing means positioned in the path and operable for detecting and for evaluating the mass rate flow of said organic compound in said vapor stream flowing towards said condensation region; a second sensing means positioned in the path operable for sensing the temperature in said condensation region; first supplying means operable for supplying water in the form of a mist or vapor into said vapor stream; second supplying means operable for supplying a hydrophobic agent into said vapor stream; third supplying means operable for supplying air at a predetermined temperature into said vapor stream so that the temperature of said vapor stream is at a temperature at least above the lowest boiling point of the mixture of said organic compound and water; condensing means positioned to contact said vapor stream in said condensation region with the added water and hydrophobic agent for condensing the vapor stream; and cooling means coupled to said condensing means and operable for maintaining the temperature difference between said condensing means and said local vapor stream sufficient to induce substantial condensation of said vapor stream.

The quantity of the water supplied to the vapor stream is preferably sufficient to form a mixture with the organic compound which will tend to induce the organic compound to condense along with the water in the condensation region. Preferably, the mixture of the organic compound and water is such that the boiling point of the azeotrope mixture is approximately at its minimum temperature. The first, second, and third supplying means are arranged in the path to mix with the vapor stream intimately.

The system also comprises condensing means positioned in the condensation region and including condensing surfaces cooled for inducing condensation of the vapor stream on the surfaces to remove the organic compound, the water, and the hydrophobic agent. Preferably, the temperature difference between the vapor stream in the condensation region and the condensing surfaces is at least about 70° C.

Preferably, the hydrophobic agent is selected to tend to adhere to the surfaces of the condensing means so that the condensation tends to be in the form of drops or beads rather than a film of condensation of the mixture. The hydrophobic agent is preferably non-reactive at the operating conditions of the process, biodegradable, forms a mist or spray reasonably well, and is compatible with the environment. The particular system requirements would, however, determine which hydrophobic agent would be acceptable in accordance with the invention.

Subsequent to the condensation region, it is preferable to provide desiccating means operable for substantially condensing the portion of the mixture remaining in the vapor stream. The use of the desiccating means allows the substantially complete removal of the organic compound.

Preferably, the condensed mixture is collected in collecting means and thereafter is subjected to recovering means operable for separating the organic compound from the water and the hydrophobic agent. The collecting means can include non-distillation processes such as reverse osmosis, pervaporation, membranes, filters, molecular sieves, and distillation.

The formation of the intimate mixture of the organic compound, the water, and the hydrophobic agent can be obtained through several known techniques for mixing such components. For example, a vortex of the water and air can be formed in the path. another technique is to introduce the water, the air, and the hydrophobic agent in a direction opposite to the flow of the vapor stream to compel the formation of vortices which will produce the intimate mixing.

Preferably, the physical shape of the condensation region from the formation of the mixture in the vapor stream to the condensing means tends to transform the vapor stream into laminar flow.

As used herein, an "azeotrope" is a mixture having a relatively constant boiling point and as used herein, a "negative azeotrope" is a mixture exhibiting a minimum boiling point.

As used herein, "laminar flow" has its usual meaning of being fluid flow in which the mass flow is generally in the form of separate laminae and simple shear exists between any adjacent laminae at different mean flow rates.

Preferably, the collecting surfaces are smooth and polished to further induce condensation.

If the organic compound is ethanol ($CH_3CH_2OH$) having a specific gravity of about 0.79, then it is preferable to use sufficient water to produce a mixture at least 60% by weight. A temperature of about 78.5° C. or higher is desirable for the condensation region. The temperature of the condensing surfaces is preferably at 12° C. or less so that the temperature difference between the temperature of the vapor and the condensing surfaces is at least about 70° C. In addition, the hydrophobic agent increases the condensation efficiency and is preferably from about 60% to about 85% by weight.

The hydrophobic agent can be a compound such as an oleic acid or a mercaptan for condensing means having metal surfaces such as aluminum and/or copper surfaces.

It is preferable to add a water treatment composition to the vapor stream to inhibit adverse phenomena such as mineral deposit buildup and to inhibit the growth of algae and bacteria. A commercially available product such as VISTA (trademark) which is sold as a bacteriostatic water treatment can be used.

The invention also relates to a process for removing an organic compound capable of forming a negative azeotrope mixture with water from a vapor stream using condensation, comprising providing a conducting system for establishing a path for communicating said detecting and evaluating the mass rate flow vapor stream into a condensation region; of said organic compound in said vapor stream flowing towards said condensation region;

sensing the temperature in said condensation region; supplying water in the form of a mist or vapor into said vapor stream; supplying a hydrophobic agent into said vapor stream; supplying air at a predetermined temperature into said vapor stream so that the temperature of said vapor stream is at a temperature at least above the lowest boiling point of the mixture of said organic compound and water and positioning condensing means in said condensation region to contact said vapor stream with the added water and hydrophobic agent.

BRIEF DESCRIPTION OF THE FIGURES

FIG. 1 is a block diagram of the system according to the present invention.

FIG. 2 shows details of the condensation portion of the system shown schematically in FIG. 1.

FIG. 3 shows details schematically of the injector arrangement in the portion shown in FIG. 2.

FIG. 4 shows details schematically of injectors shown in FIG. 3.

FIGS. 5A, 5B, and 5C show simplified flow diagrams for the system shown in FIG. 1.

DETAILED DESCRIPTION OF THE PREFERRED EMBODIMENTS

Referring to FIG. 1, it is well known that many manufacturing processes require the use of volatile organic compounds such as ethanol which must be removed from the working area represented by block 10 at a relatively high velocity of over about 600 cfm within an exhaust pipe 11 which typically has a diameter of about 10 inches. Such high speeds are needed to produce an acceptable exchange rate of air in the work area, particularly for the safety of the workers to be in compliance with various regulations established by state and federal authorities as well as insurance companies. Clean ambient air replaces the exhausted air through a plurality of inlets such as inlet area 12. Actually, the "exhausted air" is a mixture of air and ethanol here and forms a vapor stream moving through the pipe 11.

A flow meter 13 is used to detect the flow rate of the vapor stream and this information is communicated to a programmable logic control (PLC) 14 as indicated by the symbol shown. The programmable logic control 14 is basically a commercially available computer with a standard RS232 interface for analyzing the information inputted by various detectors and sensors, and for producing appropriate output signals to achieve the desired results. A suitable PLC is available from PLC Direct by Koyo Inc., 315 Allen Street, Cumming, Ga.

An input sensor 16 is connected to the PLC 14 and detects the presence of the ethanol as well as its mass rate. The PLC 14 uses the mass rate of the ethanol to control a water mist generator 17 which has water supplied from a source not shown. The water mist generator 17 supplies sufficient water to constitute 60% by weight or more of the total weight of the combination of the water and ethanol in the vapor stream. A commercially available mist generator can be used.

The PLC 14 also controls additive generator 18 to supply a mist of a hydrophobic agent such as the oleic acid and hot air generator 19. The hydrophobic agent is selected to suit the volatile organic compound, the operating conditions, and the intended disposal or recovery of the condensed vapors. The suitable amount of the oleic acid to be supplied can be determined experimentally and is based on the amount of water being supplied by the water mist generator 17 so that satisfactory condensation will occur. The optimum amounts can be easily determined experimentally for the particular arrangement and flow rates. Typically, from about 100 to about 1000 parts per billion is preferable. Injectors 20 are used to introduce the desired components.

The amount of hot air supplied by the air generator 19 is determined by temperature sensors 21 and 22A which are connected to the PLC 14. The amount of ethanol, water mist, and hot air in the vapor stream is so that the temperature at the entrance to condensing unit 23 is about 78.5° C.

The condensing unit 23 is essentially a typical condensing arrangement for condensing a vapor. Water, preferably chilled, is supplied from a water chiller 24 through pipe 26 which includes a temperature sensor 27 which is connected to the PLC 14 for monitoring. There is a return pipe 28 for the chilled water. The chilled water passes through pipes with fins in a conventional design to provide a relatively large surface area for condensing the vapor stream.

The system according to the invention results in heat transfer coefficients four to eight times what is possible using prior art condensation techniques without a hydrophobic agent because the present invention produces condensation in the form of drops or beads whereas the prior art condensation produces condensation which forms a film on the surface, thereby forming a thermal insulating layer minimizing heat transfer.

A desiccator 29 follows the condensing unit 23 to remove the remaining 15% or less by weight of moisture from the vapor stream although most of the moisture is removed during the condensation step. A temperature sensor 22B monitors the temperature out of the condensing unit 23. The sensor 22B is connected to the PLC 14. The liquid formed in the condensing unit 23 is conducted through pipe 31 to a buffer tank 32. A level sensor 33 communicates the level of liquid in the buffer tank 32 to the PLC 14 to avoid overflow, and to track and to optimize the operation of the system. A temperature sensor 22C monitors the temperature after the desiccator 29 and is also connected to the PLC 14.

A sensor 35 is used to detect the presence and level of ethanol left in the vapor stream, if any and this information is communicated to the PLC 14. Ball flow meters 36A and 36B monitor the flow rate; and shut the system off and activate emergency bypass control 37A which controls emergency bypass 37B if no flow pressure is detected at the meter 36B, the output, when flow pressure is detected at meter 36A, the input, because there may be an obstruction or some other abnormal condition. In the event of a vapor stream at sensor 35 greater or lower than a predetermined range, the PLC 14 initiates emergency shutoff and emergency bypass 37B is activated by a pneumatic and logic control PLC-I/O 38 which is coupled to the PLC 14 and activates alarm signals (not shown). The PLC-I/O 38 is also available from the same company as the PLC 14.

The emergency bypass 37B redirects the exhaust away to a system not shown for treating the vapor stream in an alternate system, thereby enabling the manufacturing to continue. The alternate system can be any suitable prior art system or another system in accordance with the present invention. Clean air exits at outlet 39.

The operation of the system after the separation of the vapor from the vapor stream depends on the desired goal. The liquid recovered can be collected in drums and disposed of in accordance with accepted practices.

There is much, however, to recommend the recycling of the ethanol using commercially known operations on the recovered liquid mixture. The following is a description of this portion of the preferred system.

A valve 40 is opened by the PLC-I/O 38 when the buffer tank 32 is at a predetermined level, usually full. A known chemical/water separation stage 41 is used initially to reduce the water content of the liquid from the buffer tank 32. The water recovery system is not shown and is a conventional design. The output or the separation stage 41 is in two parts: one part is in the form of sludge which is directed to a sludge compactor 42 and the other part is directed to a known molecular sieve arrangement 43 under the control of the PLC 14 and PLC-I/O as shown.

The output of the molecular sieve arrangement 43 is communicated to a conventional ion exchange arrangement 44 under the control of the PLC 14 and the PLC-I/O 38. A bypass 46 is provided. The output of the ion exchange arrangement 44 can be directed to drums 47 in housing 48 for disposal or returned along line 49 for reuse. The housing 48 is provided with a vent 51 and an emergency drain 52.

Figure 2:
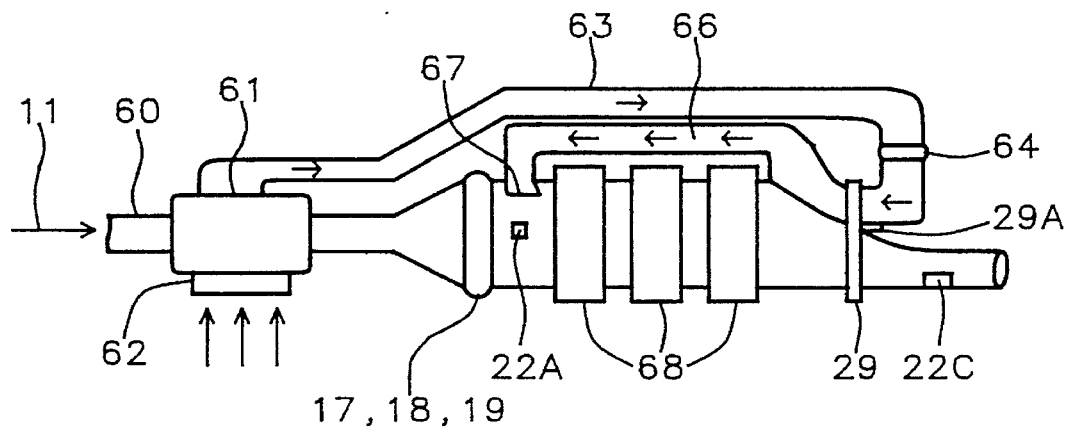

FIG. 2 shows details of the portion of FIG. 1 which shows schematically the processing portion of the operation of the invention. The vapor stream from exhaust pipe 11 enters pipe 60 at a temperature of about 120° C. and is conducted to heat exchanger 61. Ambient air enters the heat exchanger 61 through intake filter 62 and is heated by the incoming vapor stream. The heated air from the heat exchanger 61 is conducted through conduit 63 to the desiccator 29 to dry a portion of the desiccator 29.

The desiccator 29 is a commercially available desiccator in the form of a circular panel with embedded absorbent. Generally, about 75% of the circular pane (not shown) is in the path of the vapor stream to remove any remaining ethanol. Typically, the vapor stream reaching the desiccator 29 has a moisture content of about 15%. The other 25% of the circular panel is positioned in the path of the heated air in the conduit 63. An auxiliary heater 64 including a heat sensor is under the control of the PLC 14 and is used to raise the temperature of the heated air to about 100° C., if the heated air is below a predetermined temperature.

The heated air passing through the desiccator 29 becomes contaminated and is conducted through conduit 66 through a venturi 67 into the vapor stream entering the condensing unit 23 which has condensing coils 68. The vapor stream passing through the heat exchanger 61 interacts with the mists inputted from 17,18,19 through injectors 20.

Figure 3:
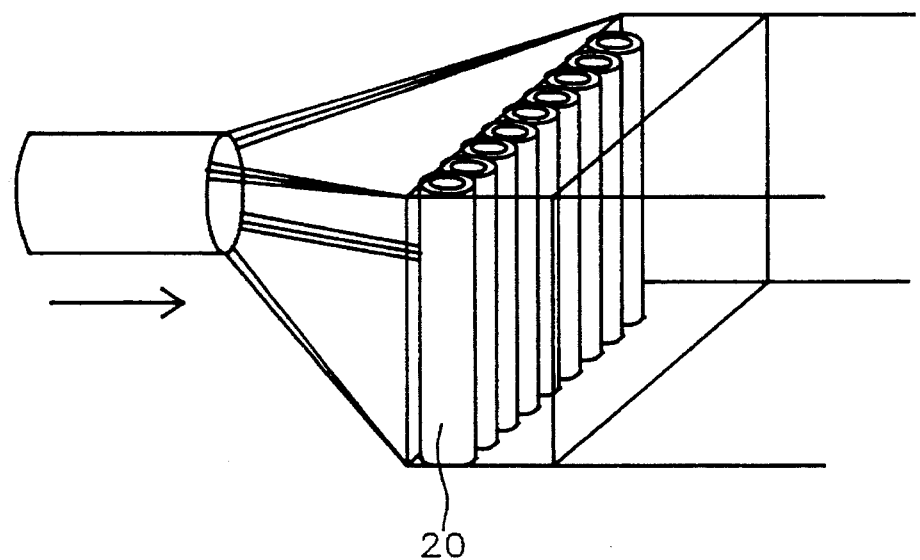
Figure 4:
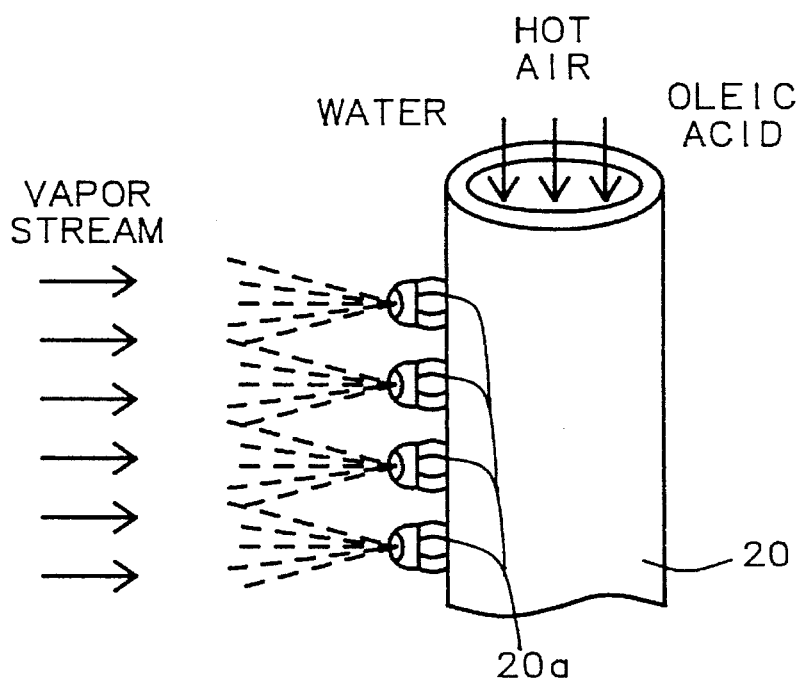

Turning now to FIGS. 3 and 4, a portion of the injectors 20 are shown schematically in an arrangement in which the outputs are opposite to the flow of the vapor stream. FIG. 3 shows a portion of an injector 20 with an input of hot air, water, and oleic acid. The injector 20 is turbine- blade shaped so that it minimizes the disruption to the flow pattern of the vapor stream. As shown in FIG. 4, injector nozzles 20a spray into the vapor stream so that non-laminar mixing enhances the intermingling of the various components.

Figure 5A:
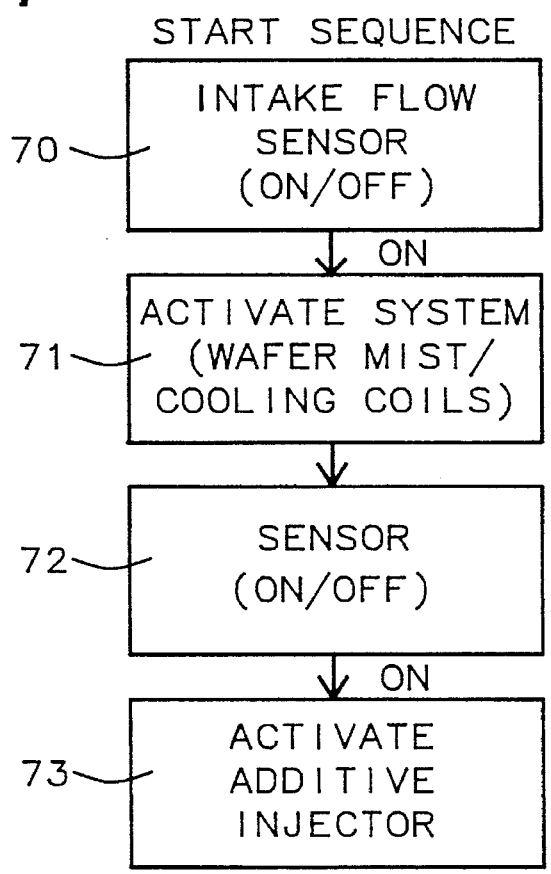
Figure 5B:
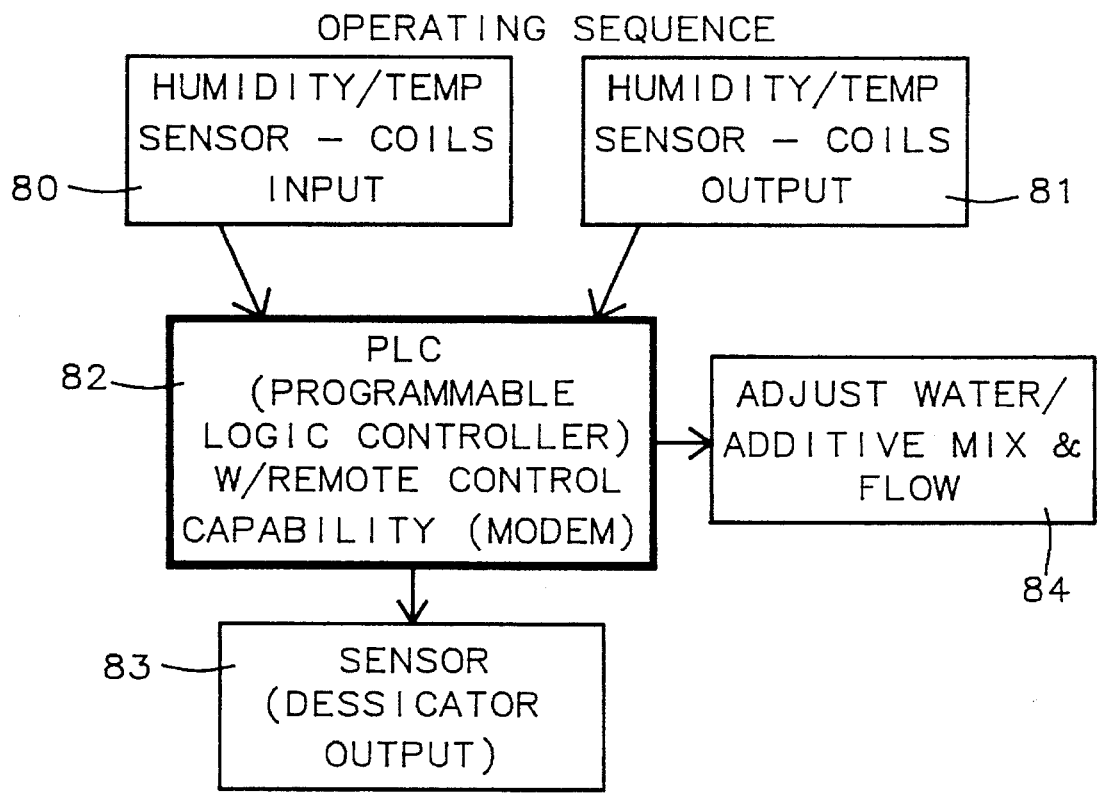
Figure 5C:
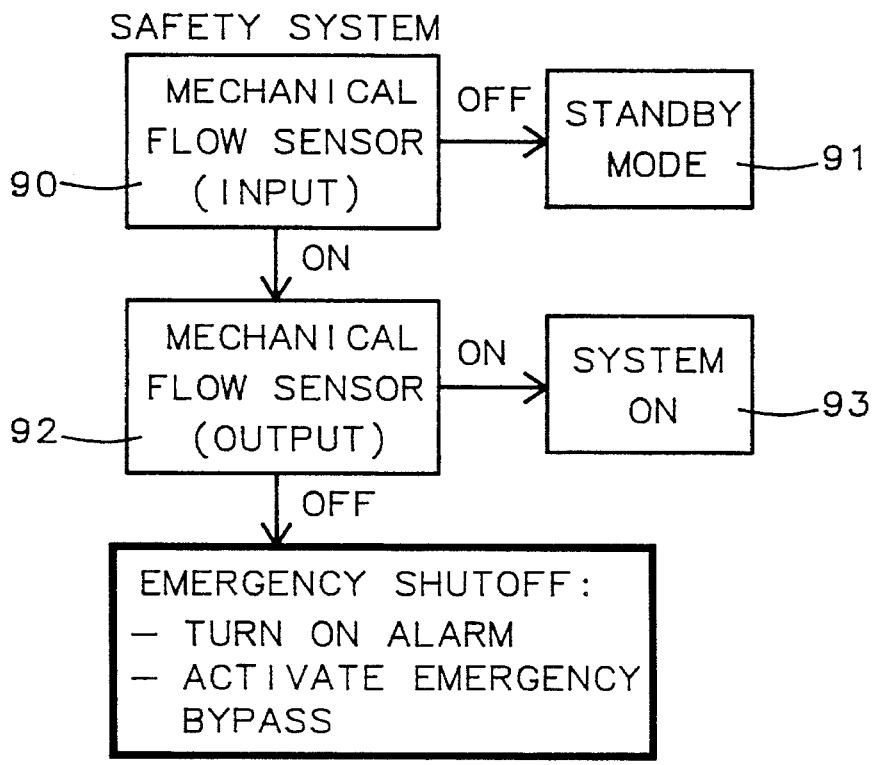

FIGS. 5A, 5B, and 5C show flow diagrams for different operational aspects. FIG. 5A generally shows the start sequence in which block 70 responds to flow meter 13 to determine if there is a vapor stream present. Block 71 activates components 17, 19, 23, 24, and 29 when the vapor stream has been detected. Block 72 shows the detection of ethanol by the sensor 16 and activates block 73 if the ethanol is present so that the additive generator 18 operates.

FIG. 5B has block 80 which is responsive to temperature sensor 22A and block 81 which is responsive to temperature sensor 22B. Block 82 takes the inputs from blocks 80 and 81 and is the PLC 14. The inputs can be through a modem transmission or some other remote capability. The block 82 also has an input from block 83 which is from the temperature sensor 22C. The block 82 drives block 84 which relates to components 17, 18, 19, and 24.

FIG. C relates to the safety system of FIG. 1. Block 90 is responsive to meter 36A which detects the flow of the vapor stream. If no flow is detected, block 91 is the standby mode; however, the detection of flow, is communicated to block 92 which also has input from the sensor 36B. Under acceptable operating conditions, block 93 maintains the system operating. If the relative flow rates detected by the sensors 36A and 36B are not within predetermined limits, the emergency shut down is activated so that components 37A and 7B are activated to divert the vapor stream.

There has been described a novel system and process. It is evident that those skilled in the art may now make numerous uses and modifications of and departures from the specific embodiments described herein without departing from the inventive concepts. Consequently, the invention is to be construed as embracing each and every feature and novel combination of features present or possessed by the system and process herein disclosed and limited solely by the spirit and scope of the appended claims.

What is claimed is:

1. A system for removing an organic compound capable of forming a negative azeotropic mixture with water from a vapor stream using condensation, comprising:
    a conducting system for providing a path for communicating said vapor stream into a condensation region;
    first sensing means positioned in the path and operable for detecting and for evaluating the mass rate flow of said organic compound in said vapor stream flowing towards said condensation region;
    a second sensing means positioned in the path operable for sensing the temperature in said condensation region;
    first supplying means operable for supplying water in the form of a mist or vapor into said vapor stream; second supplying means operable for supplying a hydrophobic agent into said vapor stream;
    third supplying means operable for supplying air at a predetermined temperature into said vapor stream so that the temperature of said vapor stream is at a temperature at least above the lowest boiling point of the mixture of said organic compound and water;
    condensing means positioned to contact said vapor stream in said condensation region with the added water and hydrophobic agent for condensing the vapor stream; and
    cooling means coupled to said condensing means and operable for maintaining the temperature difference between said condensing means and said local vapor stream sufficient to induce substantial condensation of said vapor stream.

2. The system of claim 1, further comprising supplying means operable for supplying a water treatment composition into said vapor stream before said condensing means.

3. The system as claimed in claim 1, wherein said organic compound is ethanol.

4. The system as claimed in claim 1, wherein said organic compound is isopropyl alcohol.

5. In a system for removing an organic compound capable of forming a negative azeotrope mixture with water from a vapor stream using condensing means; the improvement comprising supplying means operable for supplying a hydrophobic agent into said vapor stream prior to said condensing means.

6. The system of claim 5, further comprising supplying means operable for supplying a water treatment composition into said vapor stream before said condensing means.

7. A process for removing an organic compound capable of forming a negative azeotrope mixture with water from a vapor stream using condensation, comprising:
    providing a conducting system for establishing a path for communicating said vapor stream into a condensation region;
    detecting and evaluating the mass rate flow of said organic compound in said vapor stream flowing towards said condensation region;
    sensing the temperature in said condensation region;
    supplying water in the form of a mist or vapor into said vapor stream;
    supplying a hydrophobic agent into said vapor stream;
    supplying air at a predetermined temperature into said vapor stream so that the temperature of said vapor stream is at a temperature at least above the lowest boiling point of the mixture of said organic compound and water and
    positioning condensing means in said condensation region to contact said vapor stream with the added water and hydrophobic agent.
    cooling said condensing means and operable for maintaining the temperature difference between said condensing means and said local vapor stream sufficient to induce substantial condensation of said vapor stream.

* * * * *